J. F. CUNNINGHAM.
HOT WATER HEATING APPARATUS.
APPLICATION FILED MAY 12, 1913.
1,084,135.
Patented Jan. 13, 1914.
2 SHEETS—SHEET 1.
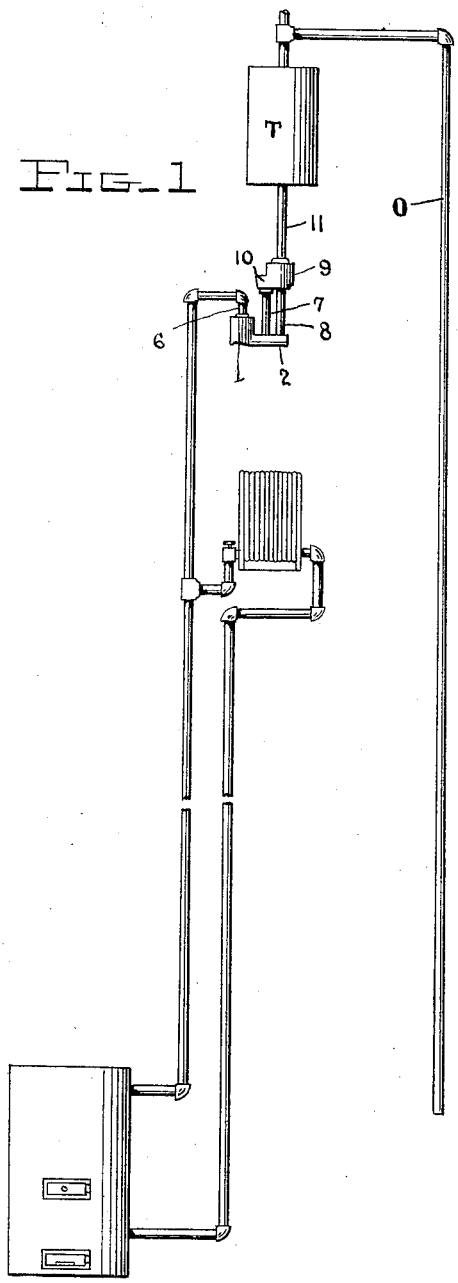
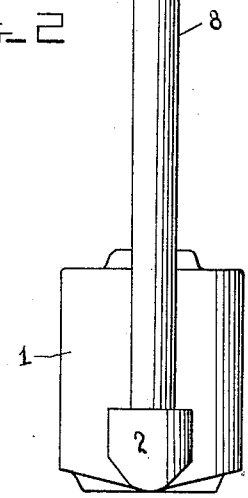
Inventor
John F. Cunningham J. F. CUNNINGHAM.
HOT WATER HEATING APPARATUS.
APPLICATION FILED MAY 12, 1913.
1,084,135.
Patented Jan. 13, 1914.
2 SHEETS—SHEET 2.
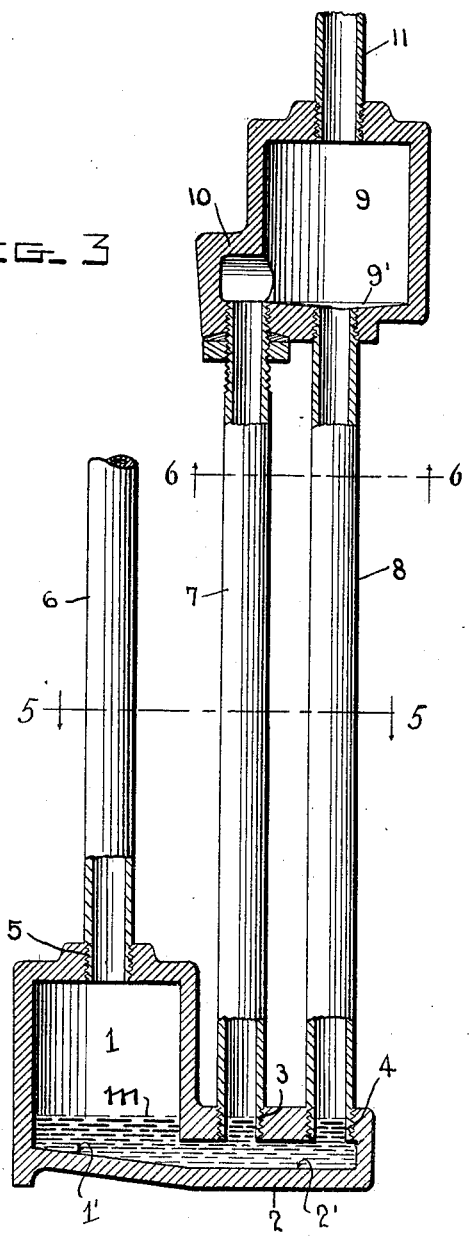
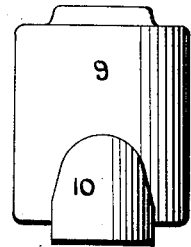
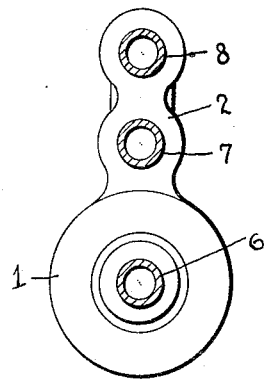
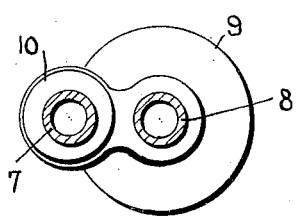
Inventor
John F. Cunningham

UNITED STATES PATENT OFFICE.

JOHN F. CUNNINGHAM, OF SPRINGFIELD, MISSOURI.

HOT-WATER HEATING APPARATUS.

1,084,135.  Specification of Letters Patent.  Patented Jan. 13, 1914.

Application filed May 12, 1913. Serial No. 767,167.

*To all whom it may concern:*

Be it known that I, JOHN F. CUNNINGHAM, a citizen of the United States, residing at Springfield, in the county of Greene and State of Missouri, have invented certain new and useful Improvements in Hot-Water Heating Apparatus; and I do declare the following to be a full, clear, and exact description of the invention, such as will enable others skilled in the art to which it appertains to make and use the same.

This invention relates to improvements in hot water heating apparatus and particularly to pressure generators therefor.

One object of the invention is to provide a pressure generator of this character whereby the expansion of the water is confined in the pipes of the system until a predetermined pressure over and above the natural pressure is obtained.

Another object of the invention is to provide a pressure generator of this character which will be simple and inexpensive in construction, efficient, reliable and automatic in operation and which may be readily installed in any hot water heating system.

With these and other objects in view, the invention consists of certain novel features of construction, and the combination and arrangement of parts as will be more fully described and claimed.

In the accompanying drawings: Figure 1 is a diagrammatic view of a portion of a heating system illustrating the application of the invention; Fig. 2 is an end elevation of the generator showing the expansion tank of the heating apparatus broken away and in section; Fig. 3 is a side view of my improved generator and a portion of one of the hot water pipes, parts being broken away and in section; Fig. 4 is a side view of the separating chamber of the generator taken from the opposite side from that shown in Fig. 2; Fig. 5 is a horizontal sectional view of the generator taken on the line 5—5 of Fig. 3; Fig. 6 is a similar view taken on the line 6—6 and looking toward the lower end of the separating chamber.

My improved pressure generator comprises a mercury chamber 1 having on one side and at the lower end thereof an extension 2 in the upper side of which and spaced a suitable distance apart are threaded apertures 3 and 4. In the top of the main portion of the mercury chamber is also formed a centrally disposed threaded aperture 5. The bottom of the extension 2 of the mercury chamber is on a slightly lower plane or level than the bottom of the main portion of the chamber, and the bottom 1' of said main portion of the chamber inclines downwardly toward the bottom 2' of the extension as shown.

Connected with the aperture 5 in the main portion of the mercury chamber is a hot water pipe 6 which may be of any desired length and connected to any pipe of the heating apparatus or system to which the generator is applied. Connected respectively with the apertures 3 and 4 in the extension 2 are mercury circulating tubes 7 and 8. The tubes 7 and 8 may be of any suitable length and the upper end of the tube 8 is connected with the bottom of the main portion of a separating chamber 9 while the upper end of the tube 7 is connected with an offset or extension 10 of said chamber and which communicates therewith. Connected with the top or upper end of the main portion of the separating chamber is an expansion pipe 11 which connects with the expansion tank T of the heating apparatus and with the upper end of which is connected the usual overflow pipe O as shown. It will be noted that the bottom 9' of the main portion of the separating chamber inclines in all directions from the sides of the chamber toward the center thereof and that the upper end of the tube 8 is connected with the center or lowest part of the bottom, so that the mercury entering the separating chamber from the tube 7 will run freely toward the center of the chamber and into the tube 8.

The operation of my improved pressure generator is as follows: As hereinbefore stated the pipe 6 may be connected with any pipe of the heating apparatus. In the mercury chamber and extension is placed the desired quantity of mercury as indicated at *m* in Fig. 3 of the drawings. When heated the water will enter the mercury chamber through the pipe 6 and when the expansion of the water has increased and sufficient pressure thus created to force the mercury out of the chamber 1 and into the extension 2 the mercury will rise in the tubes 7 and 8. As soon as the level of the mercury in the chamber 1 reaches the plane of the lower end of the tube 7 the latter will be unsealed and water will escape therethrough, but this tube will be unsealed earlier than the tube 8 because it is nearer to said chamber. The mercury in the tube 7 will be forced up into the extension 10 of the separating chamber 9 and will run therefrom into the separating chamber and from thence into the tube 8, thus permitting the water to enter the expansion pipe and tank. At the same time the pressure of the column of mercury in the tube 8 will be applied to the water in the mercury chamber and lower portion of this tube.

Any fluctuation in the pressure of the water will cause the mercury to rise into the tubes 7 and 8 as will be readily understood. The expansion tank will be placed above the highest radiator of the apparatus in the usual manner and the generator will be connected to the expansion pipe 11 at a sufficient distance from the expansion tank to cause the water in the tank to create a pressure of one pound on the mercury in the generator. As the water cools and again contracts it will force its way back again into the system or pipes of the apparatus through the tube 7 as the resistance at the point between the lower ends of the tubes 7 and 8 in the extension 2 of the mercury chamber will be very slight.

By means of a pressure generator constructed in accordance with my invention it will be seen that the expansion of the water in the heating system will be resisted and the pressure created by the expansion allowed to increase until a predetermined point is reached, this point being determined by the quantity of mercury placed in the mercury chamber. This increased pressure on the water permits the same to be heated to a higher temperature without generating steam.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

1. A pressure generator for hot water heating apparatus consisting of a mercury chamber adapted to be connected with the water circulating pipes of the apparatus, a hollow extension projecting laterally from and communicating with said chamber, a superimposed separating chamber, mercury circulating tubes connected at their lower ends with said extension at different distances from the main portion of the mercury chamber and at their upper end with the separating chamber, and mercury in the mercury chamber, the whole for use substantially as described.

2. A pressure generator for hot water heating apparatus comprising a mercury chamber adapted to be connected with the water circulating pipes of the apparatus, an extension on said chamber having its bottom in a lower plane than the bottom of the mercury chamber, the bottom of said mercury chamber being inclined toward the bottom of the extension, mercury in said mercury chamber and extension, a separating chamber, and mercury circulating tubes connected at their lower ends with said extension at different distances from said mercury chamber and at their upper ends with said separating chamber whereby when the mercury is forced out of said mercury chamber and up into the tubes one of the latter will be unsealed earlier than the other.

3. A pressure generator for hot water heating apparatus consisting of a mercury chamber adapted to be connected with the water circulating pipes of the apparatus, a hollow extension projecting laterally from and communicating with said chamber, a superimposed separating chamber having its bottom converging toward its center and a lateral extension from one side communicating with the interior of this chamber, vertical mercury circulating tubes connected at their lower ends with the extension of the mercury chamber at different distances from the main portion of the mercury chamber, and the upper end of that tube which is nearest said chamber being connected with the extension of the separating chamber while the upper end of the other tube is connected with the center of the body portion of said separating chamber, and mercury in the mercury chamber, the whole for use substantially as described.

In testimony whereof I have hereunto set my hand in presence of two subscribing witnesses.

JOHN F. CUNNINGHAM.

Witnesses:
CHARLES J. WRIGHT,
JOHN W. FAIRBANKS.